United States Patent
Mussot et al.

(10) Patent No.: US 12,013,314 B2
(45) Date of Patent: Jun. 18, 2024

(54) METHOD FOR LEAK TESTING A TANK HEAD BEFORE IT ENTERS SERVICE

(71) Applicant: AD-VENTA, Bourg de Peage (FR)

(72) Inventors: Jean-Luc Mussot, Loriol sur Drome (FR); Olivier Labrot, Portes les Valence (FR)

(73) Assignee: AD-VENTA, Châteauneuf-sur-Isère (FR)

( * ) Notice: Subject to any disclaimer, the term of this patent is extended or adjusted under 35 U.S.C. 154(b) by 861 days.

(21) Appl. No.: 17/041,153

(22) PCT Filed: Mar. 27, 2019

(86) PCT No.: PCT/FR2019/000040
§ 371 (c)(1),
(2) Date: Sep. 24, 2020

(87) PCT Pub. No.: WO2019/193260
PCT Pub. Date: Oct. 10, 2019

(65) Prior Publication Data
US 2021/0010895 A1    Jan. 14, 2021

(30) Foreign Application Priority Data

Apr. 5, 2018    (FR) ...................................... 18 00314

(51) Int. Cl.
*G01M 3/32*    (2006.01)
*F17C 13/00*    (2006.01)

(52) U.S. Cl.
CPC ......... *G01M 3/3209* (2013.01); *F17C 13/002* (2013.01); *F17C 2205/0302* (2013.01); *F17C 2223/036* (2013.01)

(58) Field of Classification Search
None
See application file for complete search history.

(56) References Cited

U.S. PATENT DOCUMENTS 6,935,163 B2 *   8/2005   Stewart ................... G01M 3/26
                                                                        73/49.7
8,499,969 B2 *   8/2013   Mussot .............. G05D 16/0666
                                                                         222/3

(Continued)

FOREIGN PATENT DOCUMENTS

| DE | 102014010090 A1 | 1/2016 |
| FR | 2486701 A1 | 1/1982 |
| WO | 2018130564 A1 | 7/2018 |

OTHER PUBLICATIONS

International Search Report for corresponding application PCT/FR2019/000040 filed Mar. 27, 2019; dated Jul. 9, 2019.

*Primary Examiner* — Kristina M Deherrera
*Assistant Examiner* — Mark A Shabman
(74) *Attorney, Agent, or Firm* — CANTOR COLBURN LLP

(57) ABSTRACT

Method for leak testing a tank head, intended to be filled with a gas under high pressure and before it enters service, which head including at least two sealing devices, referred to as an inner and an outer sealing devices, which delimit there between an intermediate space into which opens a duct which communicates with the outside, such that: said test is carried out during the manufacture of the tank assembly, after fitting the tank head and before this tank is filled with high-pressure gas, pressurized gas is injected via the duct into the intermediate space between the two sealing devices, the gas injection is stopped at a given pressure, the value of said pressure is measured via said duct.

4 Claims, 1 Drawing Sheet

(56) References Cited

U.S. PATENT DOCUMENTS

| | | | | |
|---|---|---|---|---|
| 2005/0236778 A1* | 10/2005 | Jupp | ............... | F16J 15/006 |
| | | | | 277/312 |
| 2015/0329341 A1* | 11/2015 | Wilder | ............... | F17C 1/00 |
| | | | | 206/0.6 |
| 2017/0175951 A1* | 6/2017 | Morgan | ............... | F17C 1/06 |

* cited by examiner

METHOD FOR LEAK TESTING A TANK HEAD BEFORE IT ENTERS SERVICE

TECHNICAL FIELD

The present disclosure relates to a method for leak testing a tank head before it enters service. The technical field of the disclosure is that of the manufacture of tank assemblies and gas cylinders capable of containing and supplying pressurized gas, even high-pressure gas, in particular such as hydrogen, by way of a tank head fastened to a boss on the tank.

BACKGROUND

During the manufacture of tank assemblies and after such a head has been fitted on each tank, the sealing at the fastening, generally carried out by screwing, of said tank heads must be tested to prevent any subsequent leak when the tanks are filled with gas, especially when this gas is hydrogen.

For this purpose, a known method involves filling each tank or gas cylinder up to the predetermined test pressure, then testing whether this pressure is maintained for a duration that is sufficient to conclude that there are no leaks. However, such an operation requires a test bench that is relatively expensive (an investment in the order of €1M), large quantities of gas to be pressurized (such as 35 m$^3$ at atmospheric pressure for a 50-litre cylinder to be tested at 700 bar) and a test duration of at least 20 minutes per cylinder: all of which is relatively expensive and time-consuming.

The problem faced is thus that of being able to test the sealing at the fastening of said tank heads during the manufacture of the tank assemblies, after such a head has been fitted on each tank and before completely filling the latter, either for testing purposes or for being entered into service, of these tank assemblies (a tank assembly being formed by a tank or cylinder at least equipped with the tank head thereof), on the one hand without requiring an expensive test bench and without consuming large quantities of gas, especially when this gas is hydrogen, and on the other hand using a method that can be implemented in a relatively short time, i.e. less than 5' per cylinder/tank.

Moreover, in other fields of uses, i.e. essentially for leak testing during operation after and when the cylinder/tank assemblies are in operation and thus completely filled with pressurized gas, tank heads are known, such as those disclosed in the patent applications US 2005/0236778 and DE 102014010090, and comprise two seals, one so-called primary inner seal and the other so-called secondary outer seal, and the space delimited therebetween is connected by a duct to the outside of the pressurized gas cylinder considered, on which said tank head is fastened, in order:

in the U.S. patent, to be able to inject therein a gas having an intermediate pressure to, on the one hand, reduce the pressure differential on either side of the inner seal and thus extend the life of this seal and, on the other hand, monitor the magnitude of this intermediate pressure to detect a potential leak in either seal, in the German patent, to be able to place a hydrogen sensor at the outlet of said duct to quickly detect any leak in the inner seal when the cylinder is filled with such a pressurized gas.

BRIEF SUMMARY

One solution to the problem faced is thus a method for leak testing a tank head intended to be filled with a gas under high pressure, which head, of a known type such as in the two aforementioned patents, on the one hand being fastened inside a boss located on the wall of said tank delimiting an inner chamber capable of receiving the gas and opening therein, and on the other hand including at least two sealing devices referred to as the inner and outer sealing devices which delimit therebetween an intermediate space into which opens a duct which passes through the tank head and communicates with the outside thereof, and such that, according to the disclosure:

said test is carried out during the manufacture of the tank assembly, constituted by a tank equipped with at least the tank head thereof, and after the fitting thereof, and before this tank is completely filled with high-pressure gas, either for testing purposes or to be entered into service at the operating pressure thereof and with the gas intended to be stored therein, pressurized gas is injected via said duct into the intermediate space between the two sealing devices, the injection of gas is halted at a given pressure, the magnitude of said pressure is measured via said duct, if the measurement of the magnitude of said pressure indicates a drop thereof, the environment surrounding the head is tested from the outside to detect whether there is a gas leak originating from the outer seal, and if this leak test is negative for the outer seal, it is deduced that the inner seal is leaking.

Thus, thanks to such a method according to the disclosure, there is no need to fill the inner chamber of the tank to test the sealing at the fastening of the tank head, a small quantity of gas being sufficient, which significantly reduces both the duration of the testing operation, to far below 5', as well as the cost (thanks to the low quantity of gas required, the reduced duration of the test, and the significant reduction in investment for the test bench), and not to mention improves safety.

The result is a new method for leak testing the tank head/cylinder which thus overcomes the problem faced, in particular in that this test takes place during the manufacture of tank assemblies, after such a head has been fitted on each tank and without the need to completely fill same, and thus in particular before the filling and operation of these tank assemblies, the interest wherein is shown by the aforementioned advantages. The description and the accompanying figures provide one example embodiment, however other embodiments are possible while still remaining within the scope of the present disclosure.

DETAILED DESCRIPTION

Figure 2:
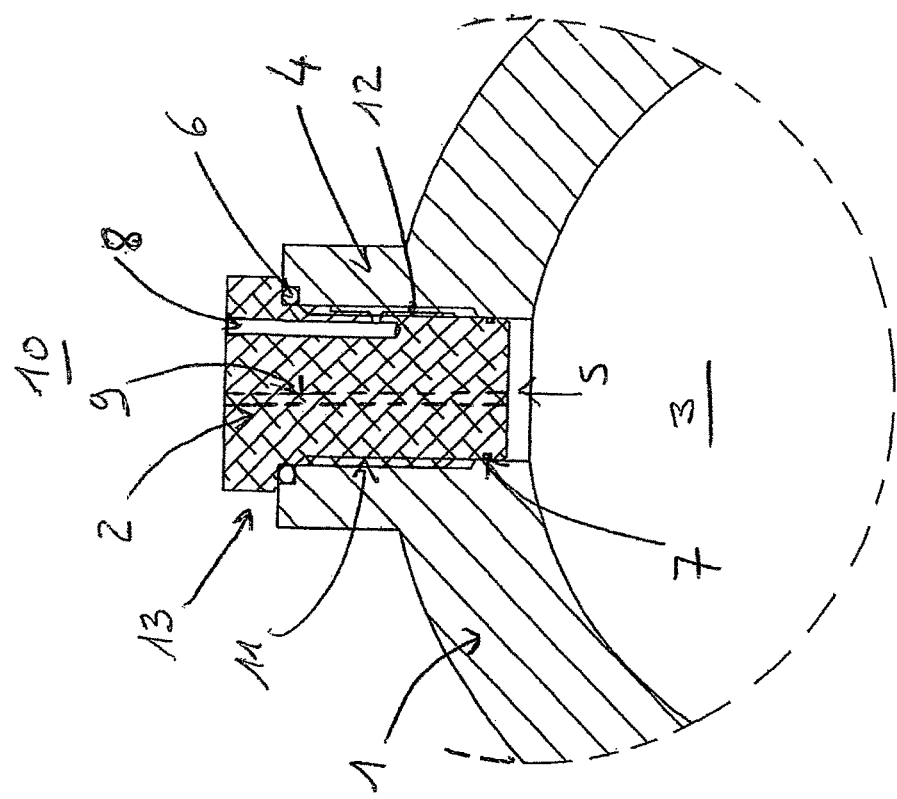
FIG. 2 is an enlarged view of the feature C in FIG. 1B showing the tank head for implementing the method according to the disclosure.

According to the representation shown in the figures, a tank head 2, intended to be filled with a high-pressure gas, is fastened, preferably by screwing 11, into a boss 4 located on the wall 1 of said tank and opening therein, said head 2 thus plugging the orifice 5 of this boss; which wall 1 delimits an inner chamber 3 capable of receiving the gas and is made of a material and has a thickness ensuring its ability to withstand the gas storage pressure such as up to at least 100 bar, and even 300 bar, or up to at least 700 bar for hydrogen.

Figure 1B:
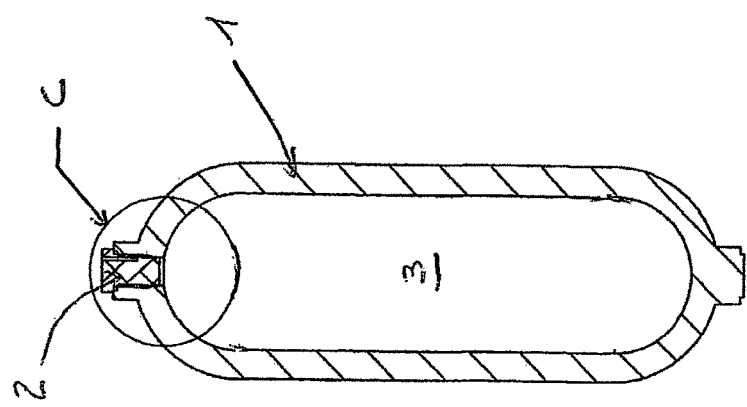
FIG. 1B shows a sectional view along the A-A' plane in FIG. 1A.
Figure 1A:
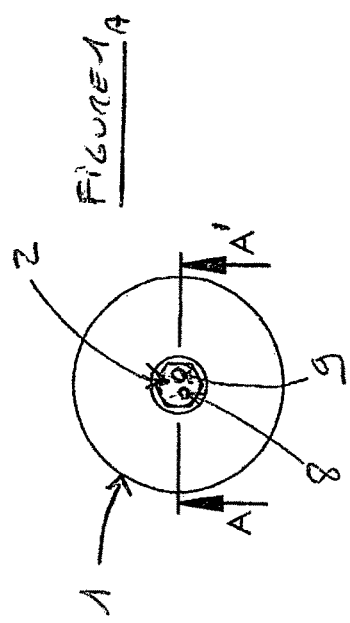
FIG. 1A is an overhead view of a gas cylinder or tank equipped with a tank head according to the disclosure, and thus forming a tank assembly.

This tank head 2 can include, depending on the uses, various ducts (such as that 9 shown in FIGS. 1A and 2 and opening out onto the top of the head 2), which pass through the thickness of the head 2 from end to end and which bring the chamber 3 into communication with the outside 10 and which thus receive, at the end thereof opening out to the outside, piping connectors, closure plugs, valves, etc.

This tank head 2 comprises at least two sealing devices 6, 7, preferably O-ring seals, referred to as an inner O-ring seal (for the seal located the closest to the chamber 3), and an outer O-ring seal (for the seal located the closest to the outside 10 of the tank), which delimit therebetween an intermediate space 12 into which opens a duct 8 that passes through the tank head 2 and communicates with the outside 10 thereof.

Thus, the sealing at the tank head 2 can be tested according to the method of the disclosure by following testing steps such as:
 carrying out said test during the manufacture of the tank assembly, constituted by said tank at least equipped with the tank head 2 thereof, after fitting same and before this tank is filled with high-pressure gas,
 injecting a pressurized gas via the duct 8 into the intermediate space 12 between the two sealing devices 6, 7,
 halting the injection of gas at a given pressure P,
 measuring the magnitude of said pressure (P) via said duct 8,
 if the measurement of the magnitude of said pressure (P) indicates a drop thereof, testing, from the outside 13, the environment surrounding the head 2 to detect whether there is a gas leak originating from the outer seal 6,
 and if the leak test is negative for the outer seal 6, deducing that the inner seal 7 is leaking.

In one preferred application, the pressurized gas used is hydrogen at a pressure of up to at least 100 bar, and even 300 bar and up to at least 700 bar, bearing in mind that the method according to the present disclosure is most advantageous when a large quantity of gas is required to carry out the test (volume/pressure ratio), i.e. especially for applications at 300/350 bar and 700 bar.

The invention claimed is:

1. A method for leak testing a tank head intended to be filled with a gas under high pressure, the head being fastened inside a boss located on a wall of a tank delimiting an inner chamber capable of receiving the gas and opening therein, and including inner and outer sealing devices which delimit therebetween an intermediate space into which opens a duct which passes through the tank head and communicates with an outside thereof, the method comprising:
 injecting pressurized gas via the duct into the intermediate space between the two sealing devices,
 halting the injection of gas at a given pressure,
 measuring the magnitude of said pressure via said duct,
 carrying out said test during manufacture of the tank assembly, constituted by equipping said tank with a tank head thereof, after fitting the tank head and before the tank is filled with a high-pressure gas having a pressure between 100 bar and 700 bar,
 and if the measurement of the magnitude of said pressure indicates a drop thereof, the environment surrounding the head is tested from the outside to detect whether there is a gas leak originating from the outer seal.

2. The method for leak testing a tank head according to claim 1, wherein if the leak test is negative for the outer seal, the inner seal is leaking.

3. The method for leak testing a tank head according to claim 1, wherein the pressurized gas used is hydrogen at a pressure of at least 100 bar.

4. The method for leak testing a tank head according to claim 1, wherein the tank head is fastened in the boss by screwing and the sealing devices used are O-ring seals.

* * * * *